UNITED STATES PATENT OFFICE.

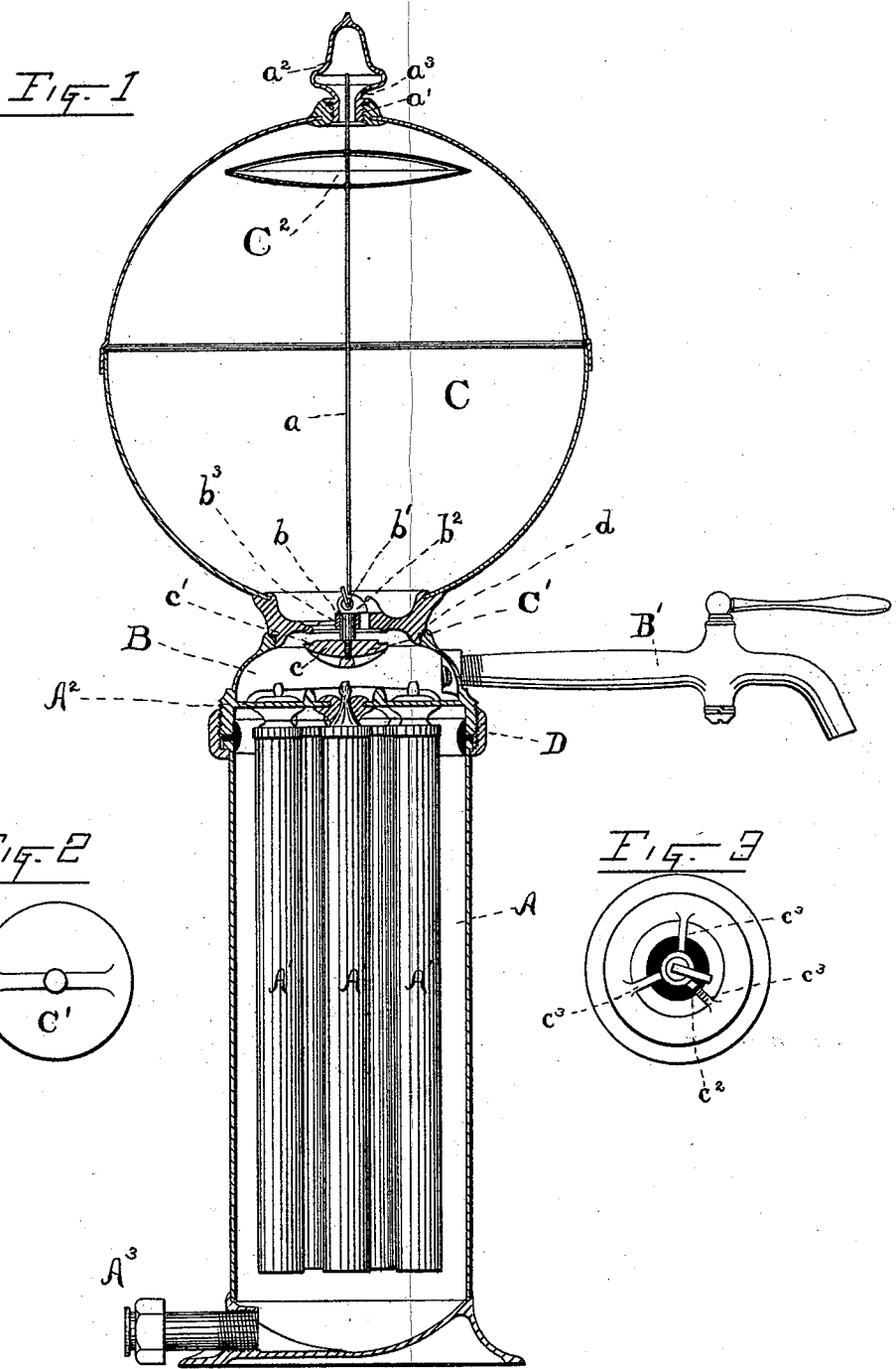

FRANK K. WAY, OF DAYTON, OHIO, ASSIGNOR TO THE PASTEUR-CHAMBERLAND FILTER COMPANY, OF SAME PLACE.

FILTER.

SPECIFICATION forming part of Letters Patent No. 497,481, dated May 16, 1893.

Application filed September 10, 1891. Serial No. 405,260. (No model.)

*To all whom it may concern:*

Be it known that I, FRANK K. WAY, a citizen of the United States, residing at Dayton, in the county of Montgomery and State of Ohio, have invented certain new and useful Improvements in Filters, of which the following is a specification.

My invention relates to improvements in filters, and it especially relates to filters operating under the *systeme Pasteur*, though the device may be applicable to other filters.

The object of my invention is to provide in filters of small capacity, a reservoir connected thereto in such a manner that it may be brought into communication with the filter when a quantity of water larger than the capacity of the filter is required at any time.

My invention consists in the various constructions and combinations of parts hereinafter described and pointed out in the claims.

In the accompanying drawings, which form a part of this specification, Figure 1 is a vertical sectional elevation of a device embodying my invention. Figs. 2 and 3 are detailed views of the valve referred to hereinafter.

In the said drawings, A represents an outer cylindrical casing in which is located a series of filtering tubes $A'$, adapted to discharge through a plate or diaphragm $A^2$, into an intermediate chamber B.

$A^3$ is a water-inlet which leads to the casing A.

$B'$ is an outlet which leads from the chamber B, into which the filtering tubes discharge.

Connected to the upper end of the chamber B, is a reservoir C, the inlet opening to which is adapted to be closed by a valve $C'$. This valve $C'$, is connected by a rod $a$, to a float $C^2$, located in the upper part of the reservoir C. The reservoir C, is preferably made of light material, such as spun brass or similar metal, and is provided at the top with an opening $a'$, in which is secured a housing $a^2$, adapted to receive and form a guide for the wire or rod $a$. This housing $a^2$, is provided with an outlet opening $a^3$, to permit the escape of air from the reservoir as the water rises therein.

In operation, the water is admitted to the chamber A, under pressure and is filtered through the tubes $A'$, into the intermediate chamber B, and rises in the reservoir C, until it meets the float $C^2$, which closes the valve $C'$, and thus cuts off further communication between the reservoir C, and the chamber B; the air from the reservoir C, as before stated, passing out through the opening $a^3$. The filtration continues until the pressure in the chamber B, is practically the same as that in the chamber A, while the reservoir C, is filled with water under no pressure except that due to the weight of water therein.

In drawing water from the filter the cock $B'$, is opened, and so long as the demand upon the filter is no greater than that supplied through the tubes, the valve $C'$, remains closed and the water is drawn directly through the filtering tubes $A'$. In the event that more water is desired than the filtering capacity of the tubes, the pressure in the chamber B, will be reduced, causing the valve $C'$, to open, thus supplying the additional quantity from the reservoir C. As soon as the valve $B'$, is closed, the filtration through the tubes $A'$, will continue until the reservoir C, is filled, the valve $C'$, closed, and the chamber B, filled under pressure as before. It will thus be seen that by providing the intermediate chamber having the outlet opening therefrom, and a reservoir connected to said chamber by an automatically operating valve, a supply of water is maintained in the reservoir which may be drawn upon in case of necessity. At the same time said reservoir is relieved from any pressure therein. The float $C^2$, being arranged above the valve, closes the same gradually and without shock, while the pressure in the intermediate chamber B, which follows the closing of the valve $C'$, holds said valve tightly closed.

The reservoir C, as before stated, is preferably made of spun brass and is hermetically sealed except for the opening $a'$, in the top. The valve $C'$, is provided with a stem $b$, having at the top an opening $b'$, into which the rod or wire $a$, is adapted to be connected; said wire being formed of a hook shape so as to engage in said opening. The lower end of the stem $b$, is screw-threaded are connected to the metallic portion $c$, of the valve $C'$; the valve proper $c'$, being preferably formed of softer material to close tightly against the seat formed on the lower part of the reservoir C. A small projection $b^2$, extending laterally from the valve-stem $b$, is adapted to engage with a projection $c^2$, at the bottom of the reservoir to prevent said stem from turning except to a limited extent. Means are thus secured by which the valve $C'$, may be removed from its stem $b$, by turning said valve until the projections $b^2$ and $c^2$, engage, after which the valve may be unscrewed for cleaning or otherwise; the reservoir being made separable from the chamber B, as shown at $d$, for this purpose. The chamber A, is also made separable from the chamber B; the parts being connected by an annular clamping-ring D, in a well known manner, to permit the chamber A, to be opened for cleaning the tubes or otherwise.

The arrangement of the reservoir with the intermediate chamber B, and the automatically closing valve between the same, it will be seen, relieves the reservoir from any undue pressure and permits the use of lighter material without the danger of leakage which occurs when the tubes are allowed to discharge directly into the reservoir, thus subjecting the reservoir to substantially the same pressure as occurs in the filtering chamber A.

The small housing $a^2$, is made removable and is adapted to cover the end of the connecting-rod or wire $a$, to form a guide for the same. By removing said housing, direct access is afforded to said rod or wire to operate the valve in the event of sticking or otherwise. The air-orifice $a^3$, is preferably placed in the lower portion of one side of said housing, and may, if desired, be closed with an antiseptic covering through which the air is adapted to pass to prevent the passage of impurities into the reservoir when the water is drawn therefrom. The valve-stem $b$, preferably passes through a central bearing $b^2$, supported by projecting wings $c^3$, in the bottom of the reservoir. The float $C^2$, being connected in the opening $b'$, in said valve-stem by the hook-shaped rod, as described, is permitted a freedom of movement by reason of the loose connection thus formed, while the valve $C'$, is adapted to move vertically and close squarely against the seat in the bottom of the reservoir.

It should be stated that in filters operating under the *systeme Pasteur* to which, as before stated, this invention particularly relates the filtering tubes are made of porous porcelain.

Having thus described my invention, I claim—

1. In a filter a filtering chamber having therein one or more filtering tubes of porous porcelain, a passage connecting the inside of said porous tube or tubes with an intermediate chamber, a reservoir also connected to said intermediate chamber, a discharge cock leading from said intermediate chamber, an inwardly opening valve in said intermediate chamber to close the passage to said reservoir, a valve stem extending from said valve through said passage, and a float connected to said valve stem and adapted to operate said valve and thus determine the quantity of liquid in said reservoir substantially as described.

2. The combination with a reservoir and an intermediate chamber, a float in said reservoir and a valve in said chamber, of a valve-stem having an engaging projection within said reservoir, and a screw-threaded stud engaging with said valve, substantially as specified.

In testimony whereof I have hereunto set my hand this 5th day of September, A. D. 1891.

FRANK K. WAY.

Witnesses:
CHARLES H. BOSLER,
J. S. MILES.